United States Patent [19]

Okabayashi

[11] Patent Number: 4,854,176
[45] Date of Patent: Aug. 8, 1989

[54] FLUIDIC FLOWMETER
[75] Inventor: Makoto Okabayashi, Osaka, Japan
[73] Assignee: Osaka Gas Co., Ltd., Osaka, Japan
[21] Appl. No.: 207,749
[22] Filed: Jun. 16, 1988
[30] Foreign Application Priority Data

| Jun. 16, 1987 | [JP] | Japan | 62-149492 |
|---|---|---|---|
| Nov. 6, 1987 | [JP] | Japan | 62-170206[U] |
| Nov. 7, 1987 | [JP] | Japan | 62-170199[U] |
| Nov. 9, 1987 | [JP] | Japan | 62-171817[U] |
| Mar. 3, 1988 | [JP] | Japan | 63-50886 |

[51] Int. Cl.[4] ............................................. G01F 1/20
[52] U.S. Cl. ................................. 73/861.19; 137/826; 137/833
[58] Field of Search ..................... 73/861.19; 137/809, 137/810, 811, 826, 833, 557

[56] References Cited

U.S. PATENT DOCUMENTS

| 3,331,382 | 7/1967 | Horton | 137/809 |
|---|---|---|---|
| 3,468,326 | 10/1967 | Cohen | 137/810 |
| 3,902,367 | 9/1975 | Grant et al. | 137/833 |
| 4,550,614 | 11/1985 | Herzl | 73/861.19 |
| 4,610,162 | 9/1986 | Okayashi et al. | 73/861.19 |

FOREIGN PATENT DOCUMENTS

| 57-66313 | 4/1982 | Japan . |
|---|---|---|
| 59-187211 | 10/1984 | Japan . |
| 108115 | 5/1987 | Japan . |
| 1081421 | 3/1984 | U.S.S.R. . |
| 1101599 | 7/1984 | U.S.S.R. . |
| 2120384 | 11/1983 | United Kingdom . |

OTHER PUBLICATIONS

O. Lew Wood, "Devices", Jun. 24, 1965, p. 172.

Primary Examiner—Herbert Goldstein
Attorney, Agent, or Firm—Gifford, Groh, Sheridan, Sprinkle and Dolgorukov

[57] ABSTRACT

A fluidic flowmeter having a reduced diameter pipe portion, a discharge nozzle and an enlarged diameter pipe portion disposed in series in the order of fluid flow direction, a pair of control nozzles formed on a boundary between the discharge nozzle and the enlarged diameter pipe portion and oriented substantially normal to the discharge direction of the discharge nozzle, the control nozzles facing each other, a pair of return flow passages connecting between the respective control nozzles and a downstream side of the enlarged diameter pipe portion, a target for stabilizing switching of fluid flow direction at the enlarged diameter pipe portion, a flow amount measuring sensor for detecting a variation in pressure or flow amount due to a variation in the flow direction of discharged fluid from the discharge nozzle, a pair of first partition walls for sectioning the enlarged diameter pipe portion, the control nozzles and the return flow passages, a second partition wall for forming discharge passages together with the first partition walls. A face of the target directed towards the discharge nozzle is positioned between a straight line interconnecting center portions of outer peripheral faces of the first partition walls and another straight line interconnecting leading edges of the first partition walls at the control nozzle side.

10 Claims, 15 Drawing Sheets

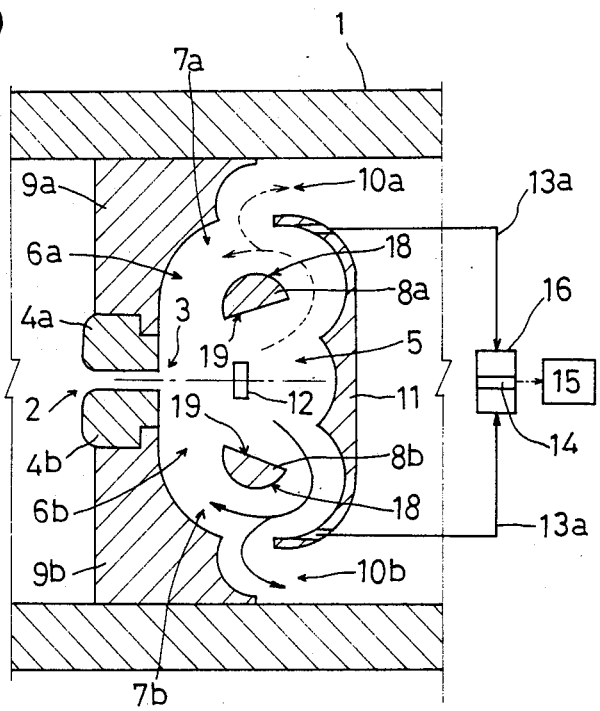
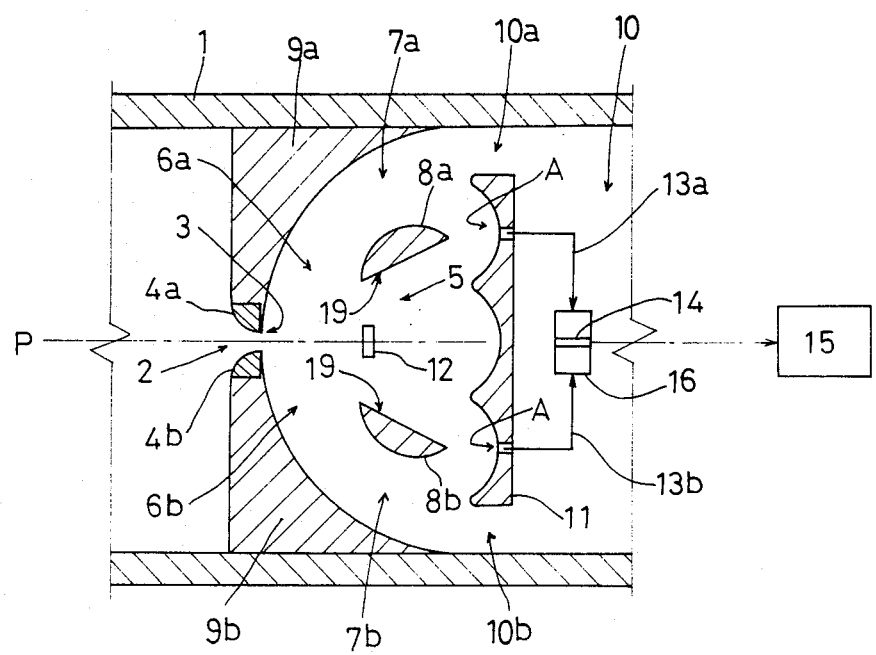
FIG. 14

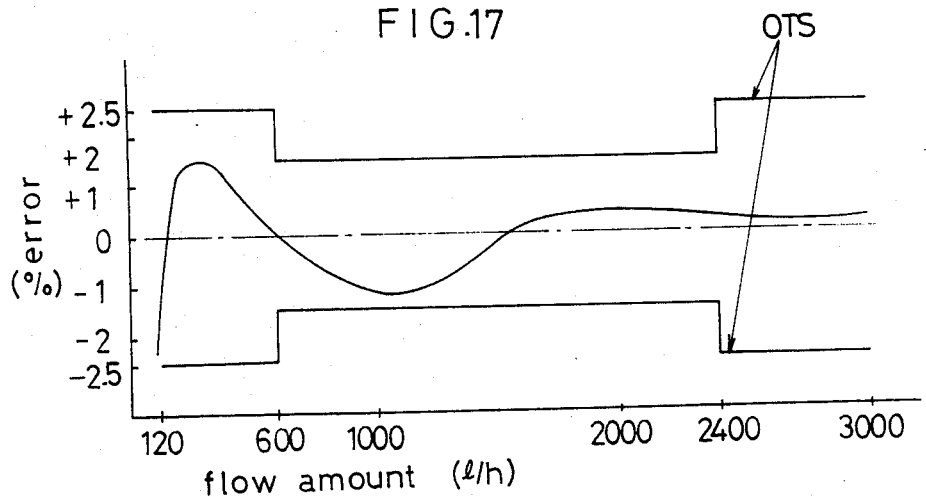
FIG.17
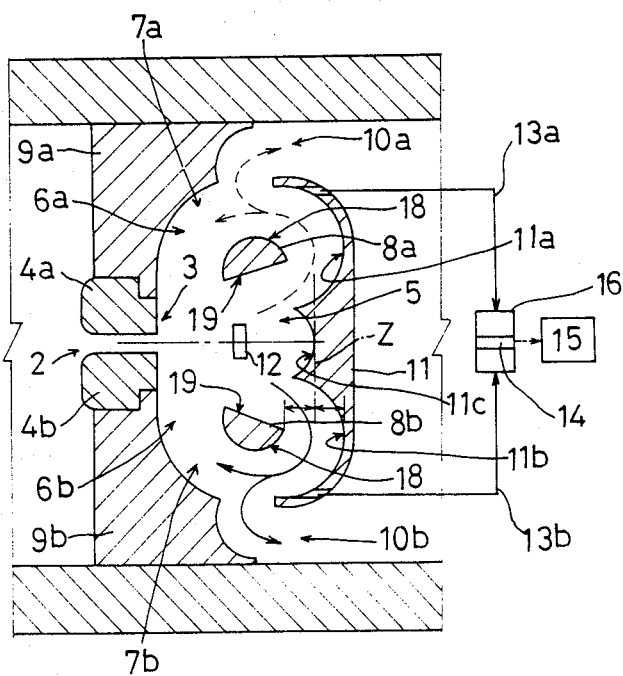
FIG·18

FIG. 25
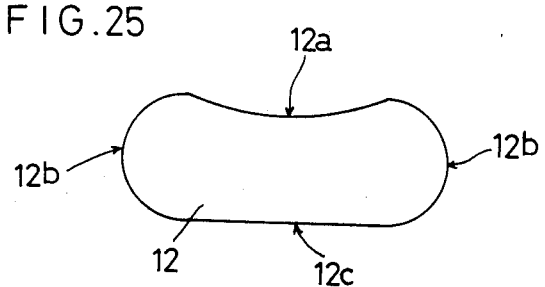
FIG. 26
(a) 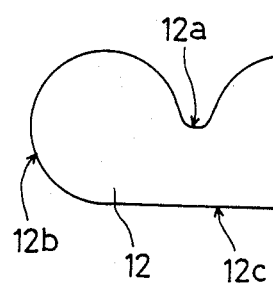 (b) 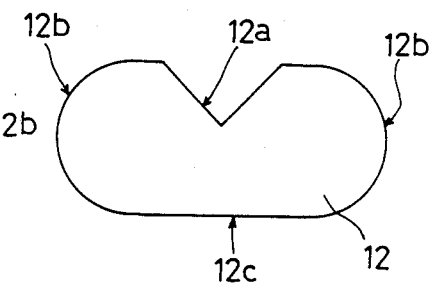
FIG. 26
(c)
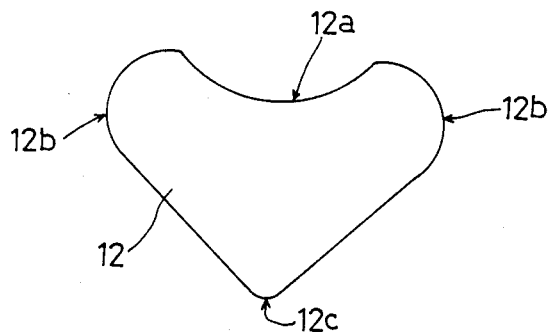

FLUIDIC FLOWMETER

BACKGROUND OF THE INVENTION

(1) FIELD OF THE INVENTION

The present invention relates to a fluidic flowmeter, and more particularly to a fluidic flowmeter of the type comprising a reduced pipe portion, a discharge nozzle and an enlarged pipe portion disposed in this order, a pair of control nozzles provided at a boundary between the discharge nozzle and the enlarged pipe portion and oriented substantially normal to a discharge direction of the discharge nozzle, the pair of control nozzles facing each other, a pair of return flow passages connecting between the respective control nozzles and a downstream side of the enlarged pipe portion, a target for stabilizing switching of a flow direction at the enlarged pipe portion, a flow amount measuring sensor for detecting a pressure variation or flow amount variation resulting from a change in the direction of flow discharged from the discharge nozzle, a pair of first partition walls for sectioning between the enlarged pipe portion, the control nozzles and the return passages, and a second partition wall for forming a discharge passage together with the first partition walls.

(2) DESCRIPTION OF THE PRIOR ART

A conventional fluidic flowmeter, as shown in FIG. 29, comprises an enlarged pipe portion 5, control nozzles 6a, 6b, return passages 7a, 7b, a pair of wing-shaped first partition walls 28a, 28b, a second partition wall 31 for forming starting ends of the return flow passages 7a, 7b together with the first partition walls 28a, 28b and for shutting off a downstream side of the enlarged diameter pipe portion 5, and a target 12 disposed at a downstream side apart from a discharge nozzle 3 inside the enlarged pipe portion 5 (Japanese laid-open patent No. 62-108115).

In the above fluidic flowmeter; however, as shown in FIG. 30, there remains the problem to be solved that there occurs a large measurement error especially in measuring a small flow amount if the flow amount measurement is attempted over a larger measuring flow amount range.

SUMMARY OF THE INVENTION

Taking the above state of the art into consideration, it is the primary object of the present invention to provide a fluidic flowmeter capable of achieving an accurate flow amount measurement irrespectively of flow amount volume over a wide measuring flow amount range through simple and easy improvements in the configuration of the partition wall and in the positioning of the target.

In order to accomplish the above object, a fluidic flowmeter related to the present invention comprises a reduced pipe portion, a discharge nozzle and an enlarged pipe portion disposed in this order, a pair of control nozzles provided at a boundary between the discharge nozzle and the enlarged pipe portion and oriented substantially normal to a discharge direction of the discharge nozzle, the pair of control nozzles facing each other, a pair of return passages connecting between the respective control nozzles and a downstream portion of the enlarged pipe portion, a target for stabilizing switching of a flow direction at the enlarged pipe portion, a flow amount measuring sensor for detecting a pressure variation or flow amount variation resulting from a change in the direction of flow discharged from the discharge nozzle, a pair of first partition walls for sectioning between the enlarged pipe portion, the control nozzles and the return passages, and a second partition wall for forming a discharge passage together with the first partition walls, with a face of the target directed towards the discharge nozzle is positioned between a straight line interconnecting center portions of outer peripheral faces of the first partition walls and another straight line interconnecting leading edges of the first partition walls at the control nozzle side.

Functions and effects of the above-described construction will be described next.

The inventor conducted experiments for seeking a configuration of the partition walls to be disposed in the flowmeter and positioning of the target optimal for minimizing the flow amount measurement error, and found the following facts.

That is, as shown in FIG. 1, when a pair of partition walls 8a and 8b are provided with substantially cylindrical outer peripheral faces, and at the same time when a face 12a of a target 12 towards a discharge nozzle 3 is positioned between a straight line X interconnecting center portions of the outer peripheral faces of the first partition walls 8a and 8b and another straight line Y interconnecting leading edges of the first partition walls 8a and 8b at the control nozzle side, the best result is obtained with the measurement error of less than 2% over the wide measurement range between the maximum flow amount of 3,000 l/h and the minimum flow amoung of 150 l/h.

On the other hand, in the case of the prior art flowmeter shown in FIG. 29, the error for the same flow amount range (3,000 to 150 l/h) is larger than 10% at its maximum in the small flow amount range of 150 to 300 l/h. As being apparent from comparison between FIG. 2 and FIG. 30, according to the present invention, it becomes possible to effect accurate measurement of a small flow amount even if the flow amount measurement range is extended considerably.

As the result, through simple and easy improvement on the position of the target, the present invention has achieved accurate measurement of small flow amount and consequently has extended the usage and application of the fluidic flowmeter.

Further and other advantages and features of the fluidic flowmeter related to the present invention will become more apparent from the following description with reference to the accompanying drawings.

BRIEF DESCRIPTION OF THE DRAWINGS

FIG. 17 is a graph showing results of experiments using the fluidic flowmeter of FIG. 16, FIG. 18 is a section view showing a fluidic flowmeter according to still another embodiment of the present invention, FIG. 25 is a view showing a configuration of a target used in the fluidic flowmeter of FIG. 24, FIGS. 26(a), 26(b) and 26(c) are views showing configurations of targets according respectively to other embodiments of the present invention.

DESCRIPTION OF THE PREFERRED EMBODIMENTS

Preferred embodiments of a fluidic flowmeter related to the present invention will be particularly described next with reference to the accompanying drawings.

Figure 1:
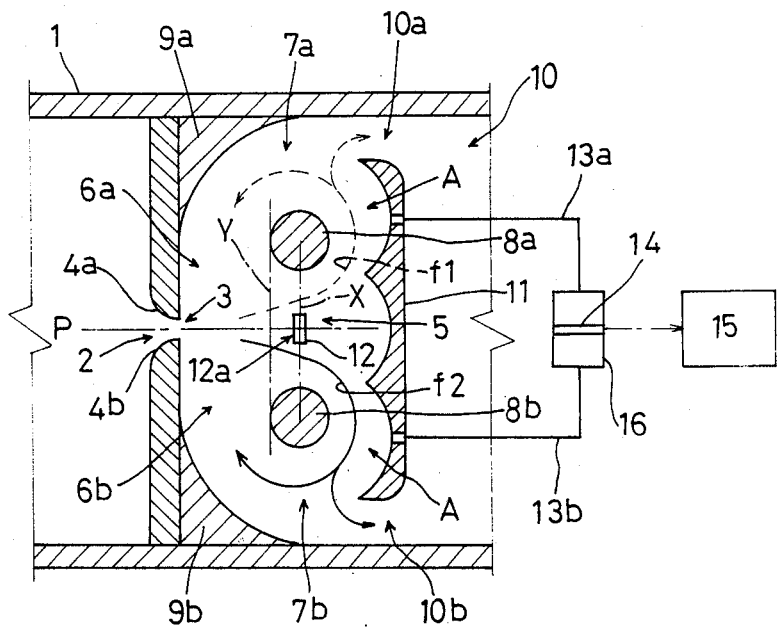
FIG. 1 is a section view showing a preferred embodiment of a fluidic flowmeter related to the present invention.

Referring to FIG. 1, a pair of first flow passage forming members 4a and 4b for forming a reduced pipe portion 2 and a discharge nozzle 3 inside a pipe 1 are disposed symmetrically each other relative to a pipe center axis P, whereby a fluid is guided smoothly by the effect of the reduced pipe portion 2 and is discharged through the discharge nozzle 3 in substantially parallel with the pipe center axis P. Further, there are disposed symmetrically each other relative to the pipe center axis P a pair of first partition walls 8a and 8b for sectioning a pair of return passages 7a and 7b communicating a pair of control nozzles 6a and 6b and between a downstream side of an enlarged pipe portion 5 and the respective control nozzles 6a and 6b. Also, the pair of control nozzles 6a and 6b are opposed to each other such that the control nozzles 6a and 6b are oriented substantially normal to the discharge direction of the discharge nozzle 3.

Further, there is provided a second partition wall 11 forming a pair of discharge passages 10a and 10b togetherwith the pair of partition walls 9a and 9b, with the second partition wall 11 shutting off the downstream side of the enlarged pipe portion 5, and with inlet openings of the discharge openings 10a and 10b being communicated respectively with inlet openings of the return passages 7a and 7b.

In operation, when a fluid discharge operation is initiated through the discharge nozzle 3, the discharged fluid is caused by the Coanda effect to flow in a direction denoted by a broken line f1 along one of the first partition wall 8a, whereby a considerable fluid energy is applied from the return passage 7a to the control nozzle 6a disposed at the side of this partition wall 8a thereby causing the discharged fluid to flow in a direction denoted by a solid line f2 along the opposite partition wall 8b. Then, by the fluid energy from the opposite control nozzle 6b, the discharged fluid is again caused to flow in the direction of the broken line f1 along the partition wall 8a along which the fluid has flown initially. Accordingly, the flow direction of the discharged fluid varies by a decreasing cycle for an increasing disharge flow amount with the cycle and the flow amount keeping a constant relationship.

The first partition walls 8a and 8b are formed to be substantially cylindrical; and also a target 12 for stabilizing switching of flow direction at the enlarged pipe portion 5 is provided with a face 12a of the target directed towards the discharge nozzle 3 is positioned between a straight line X interconnecting center portions of outer peripheral faces of the first partition walls 8a, 8b and another straight line Y interconnecting leading edges or the upstream ends of the first partition walls 8a, 8b at the side of the control nozzle 6a and 6b.

Figure 2:
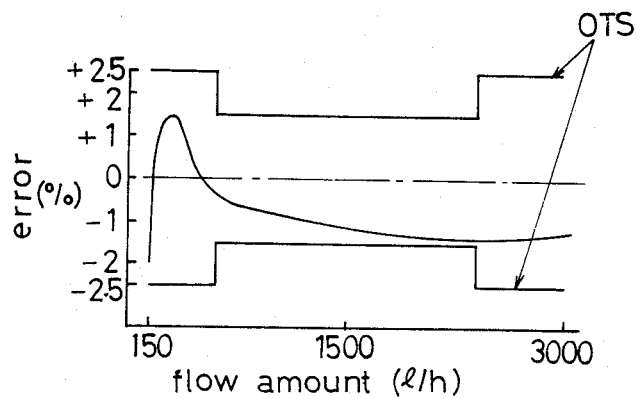
FIG. 2 is a graph illustrating results of experiments using the fluidic flowmeter of FIG. 1.

With the above-described arrangement, as shown in FIG. 2, it becomes possible, for example, to restrict the error in a flow amount measurement within the Japanese Official Tolerance Standard for a home-use city-gas meter even if the measurement flow amount range is extended to e.g. 150 to 3,000 l/h required of the city gas home-use gas meter.

A pair of pipes 13a and 13b respectively communicating with reverse flow portions A at the inlet openings of the return passages 7a and 7b are connected to a sealed case 16 disposed inside a combined flow discharge passage 10. Also, inside this sealed case 16, there is attached a pressure sensor 14 such that fluid pressures from the pipes 13a and 13b act in opposition directions on this sensor 14. In operation, this pressure sensor 14 detects a pressure variation resulting from a flow direction variation of the discharged flow from the discharge nozzle 3 and delivers a wave-shaped signal having a sinusoidal curve to a flow amount measuring device 15 which calculates and displays a flow amount value from the frequency of the wave-shaped signal.

Incidentally, the first partition walls 8a and 8b may be formed to be substantially tubular.

Also, the face 12a of the target 12 toward the discharge nozzle 3 may be disposed on the straight lines X and Y.

Further, the pipes 13a and 13b respectively communicating with the reverse flow portions A at the inlet openings of the return passages 7a and 7b may be connected to the sealed case 16 disposed outside the combined flow discharge passage 10. Also, the pressure sensor 14 may be disposed such that the sensor 14 detects a pressure variation at one of the reverse flow portions A at either of the inlet openings of the return passages 7a and 7b. In this case, the pressure sensor 14 may be disposed at the reverse flow portion A. Further, a flow amount sensor may be provided in place of the pressure sensor; and these sensors 14 may be disposed at either of the pair of return passages 7a and 7b.

Figure 3:
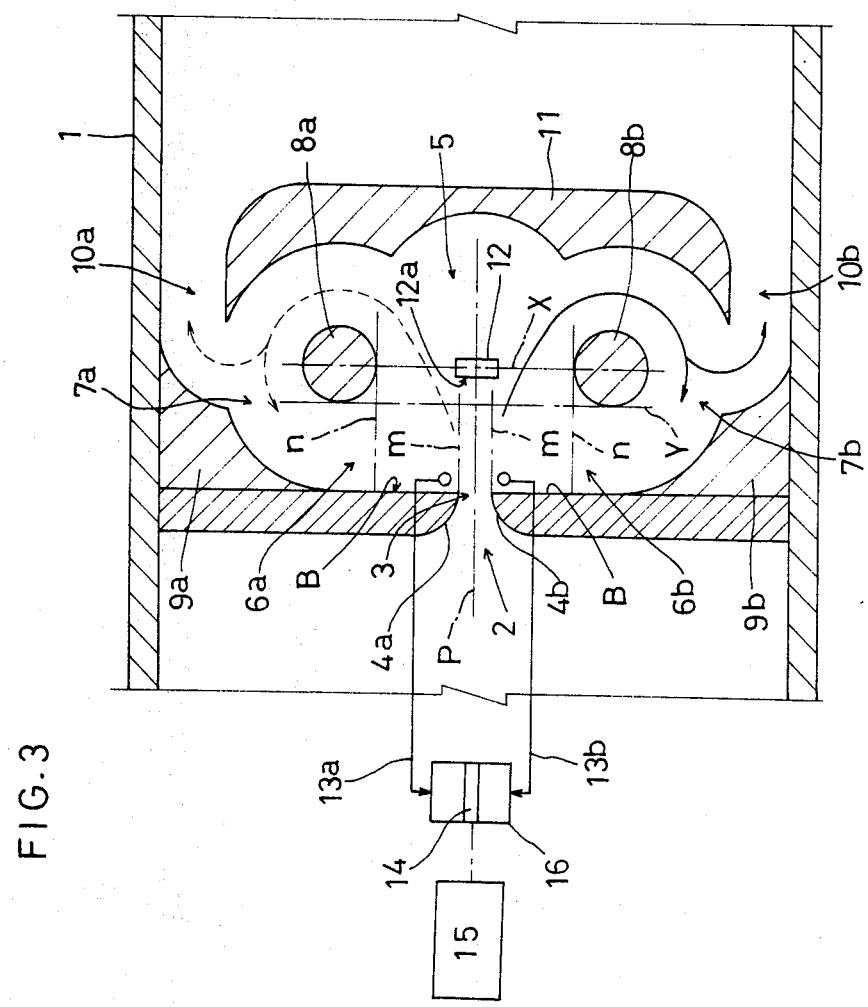
FIG. 3 is a section view showing a fluidic flowmeter having its pressure sensor positioned differently according to another embodiment.

As shown in FIG. 3, the pressure sensor 14 may be positioned such that the sensor 14 functions within an area surrounded by a straight line m passing through through the periphery of the opening of the discharge nozzle 3 in parallel with a discharge center axis P of the discharge nozzle 3 as being viewed centrally of the first partition walls 8a and 8b and a straight line n parallel to the discharge center axis P and line m, in contact with the point on the first partition walls 8a and 8b closest to the side of the target 12, a straight line Y extending between the upstream ends of the outer peripheral faces of the first partition walls 8a and 8b and by a wall face B formed continuously with the discharge nozzle 3. This arrangement is advantageous in that measurement of a small or large flow amount may be carried out stably with waveshaped signals having a regular shape.

Figure 4:
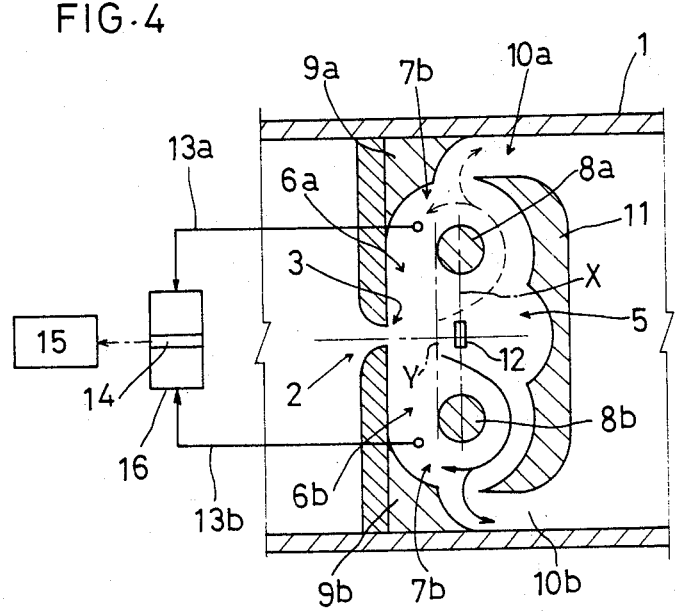
FIGS. 4 and 5 are section views showing the fluidic flowmeter of FIG. 3 the position of the pressure sensor of which is varied for the purpose of comparison.
Figure 5:
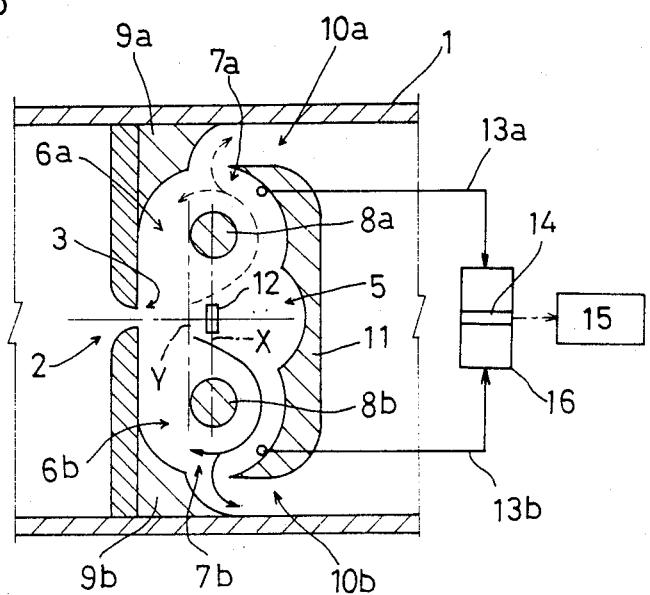
Figure 6:
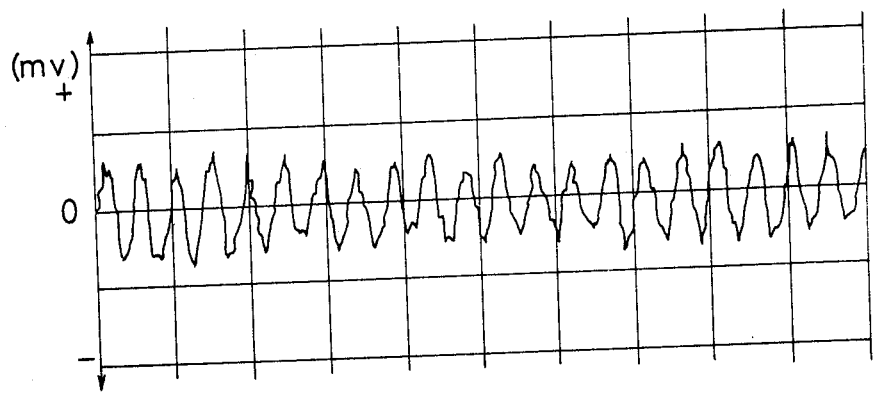
FIGS. 6 through 8 are graphs illustrating wave-shaped signals obtained when a minute flow amount is measured by using using the fluidic flowmeters of FIGS. 3 through 5, FIGS. 9 through 11 are graphs illustrating wave-shaped signals obtained when a minute flow amount is measured by using the fluidic flowmeters of FIGS. 3 through 5.
Figure 7:
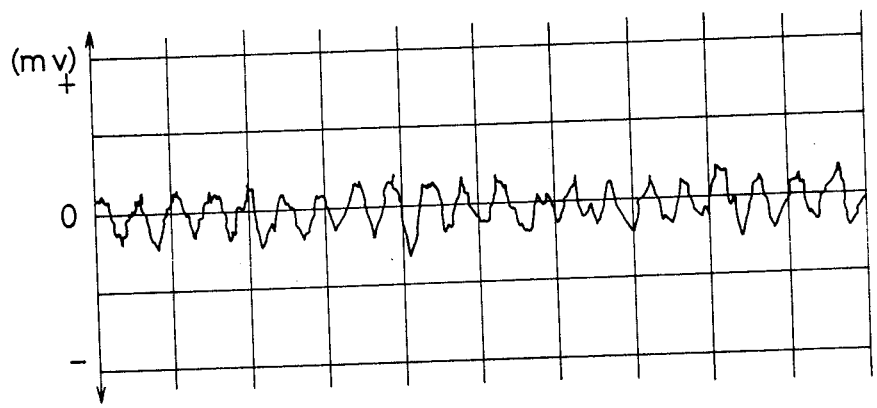
Figure 8:
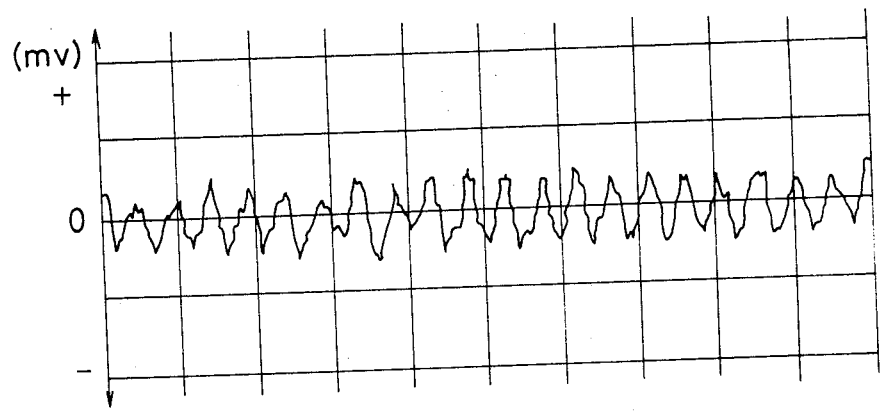
Figure 9:
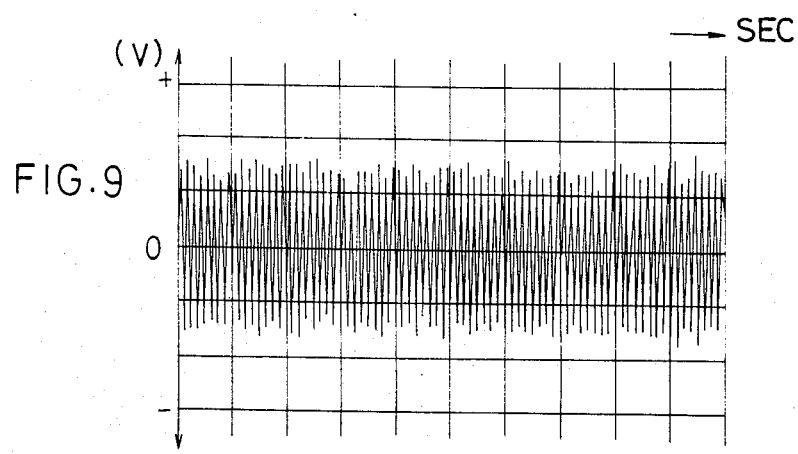
Figure 10:
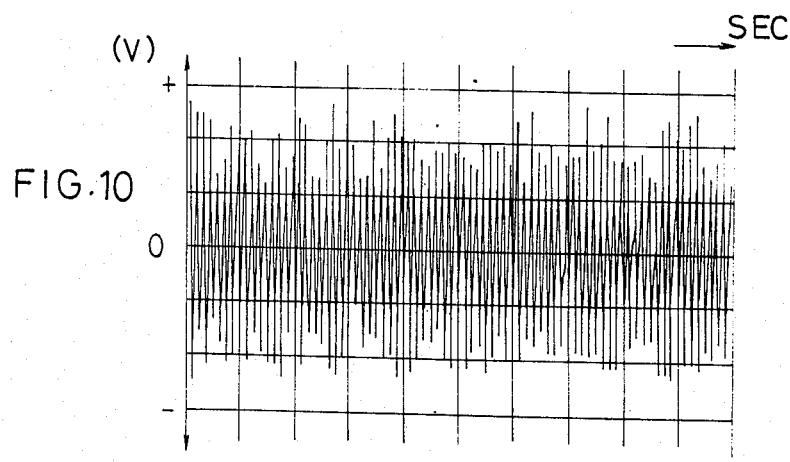
Figure 11:
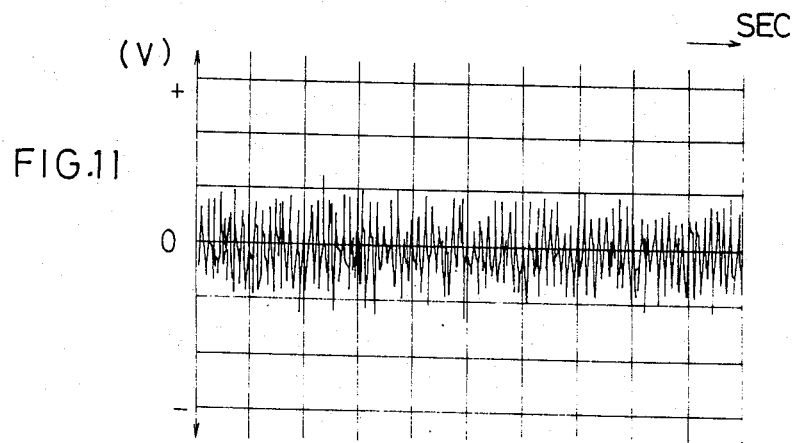

Experiments were conducted with varying the position of the pressure sensor 14 as shown in FIG. 4 and 5, and the results were compared with the arrangement of FIG. 3. Wave-shaped signals from the pressure sensor 14 in these positions shown in FIGS. 3 through 5 are illustrated in FIGS. 6 through 8 for the small flow amount of measurement and also in FIGS. 9 through 11 for the large flow amount measurement.

As being apparent from comparison of FIGS. 6 through 11, with the pressure detection range of the present invention shown in FIG. 3, the pressure sensor 14 provide wave-shaped signals having large and regular oscillations, whereby a still more accurate flow amount measurement is possible.

Many variations are possible in the configuration of the first partition walls 8a and 8b in place of the substantially cylindrical configuration shown in FIGS. 1 and 3 through 5. For example, the first partition walls are also effective if the same have a substantially semicylindrical configuration as shown in FIGS. 12, 14(a), 14(b) and FIG. 15.

Figure 12:
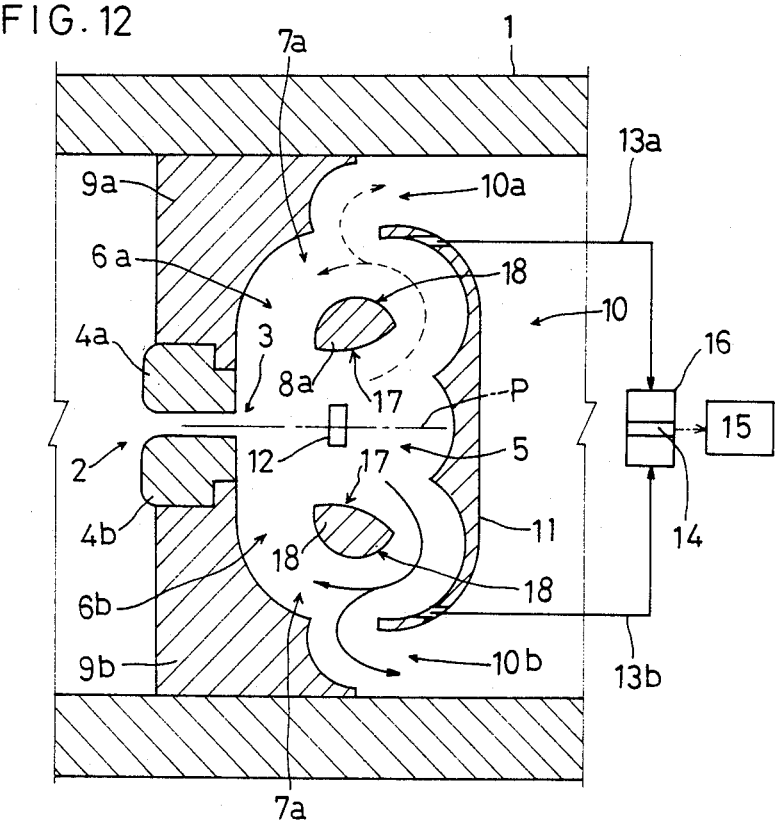
FIG. 12 is a section view showing a fluidic flowmeter according to still another embodiment of the present invention.

More specifically, in FIG. 12, the partition walls 8a and 8b respectively have the substantially semicylindrical outer periphery having a curved face portion 17 with a large curvature radius and another curved face portion 18 with a small curvature radius. And, the large-curvature-radius curved face portion 17 is disposed adjacent the enlarged pipe portion 5; whereas, the small-curvature-radius curved face portion 18 is disposed adjacent the return passages 7a, 7b and the control nozzles 6a and 6b. The target 12 for stabilizing the switching of flow direction at the enlarged pipe portion 5 is disposed between the partition walls 8a and 8b.

Figure 13:
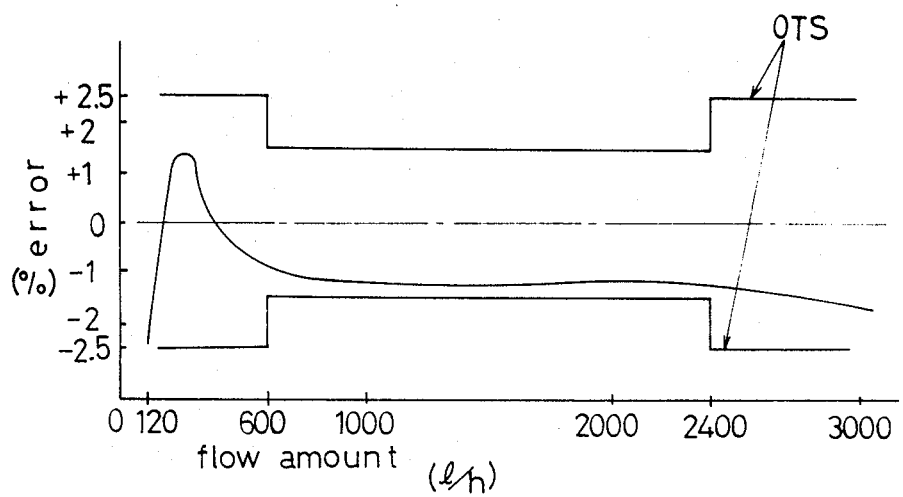
FIG. 13 is a graph showing results of experiments using the fluidic flowmeter of FIG. 12, FIGS. 14(a) and 14(b) are section views of fluidic flowmeters of other embodiments of the present invention.

With the above-described arrangement, as shown in FIG. 13, it becomes possible; for example, to restrict the error in a flow amount measurement within the Japanese Offcial Tolerance Standard of ±2.5% for a home-use city-gas meter even if the measurement flow amount range is extended to e.g. 120 to 3,000 l/h required of the gas meter of this type.

Figure 15:
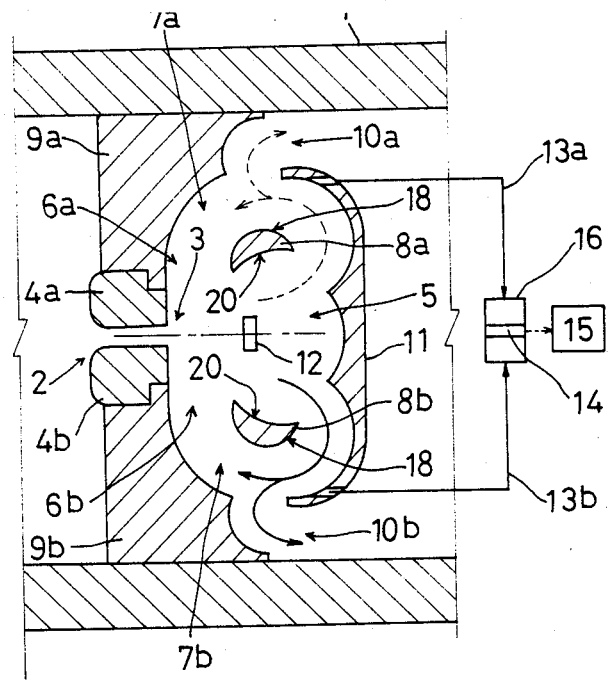
FIG. 15 is a section view showing a fluidic flowmeter according to still another embodiment of the present invention.

The outer peripheral faces of the partition walls 8a and 8b may be formed, as shown in FIGS. 14(a) and 14(b), by a flat face portion 19 facing the enlarged pipe portion 5 and by the curved face portion 18 facing the return passages 7a and 7b and the control nozzles 6a and 6b. Also, as shown in FIG. 15, the outer peripheral faces may be constituted by a concave curved face portion 20 having a large curvature radius and facing the enlarged pipe portion 5 and by the small-curvature-radius curved face portion 18 facing the return flow passages 7a, 7b and the control nozzles 6a, 6b . Further, the flat face portion 19 may be curved, or may be formed differently depending on the convenience. And, the partition walls 8a and 8b may have a hollow tubular construction. That is to say, it is essential for achieving a distinguished effect that the partition walls 8a and 8b have the substantially semicylindrical outer peripheral faces.

The pipes 13a and 13b respectively communicating with the return flow passages 7a and 7b may be connected to the sealed case 16 disposed externally of the flowmeter. Also, the pressure sensor 14 may be arranged to detect a pressure variation at either of the return flow passages 7a and 7b. In this case, the pressure sensor 14 may be disposed in either of the return flow passages 7a and 7b. Further, it is also possible to provide a flow amount sensor in place of the pressure sensor, and these sensors 14 may be disposed in either of the return flow passages 7a and 7b.

Figure 16:
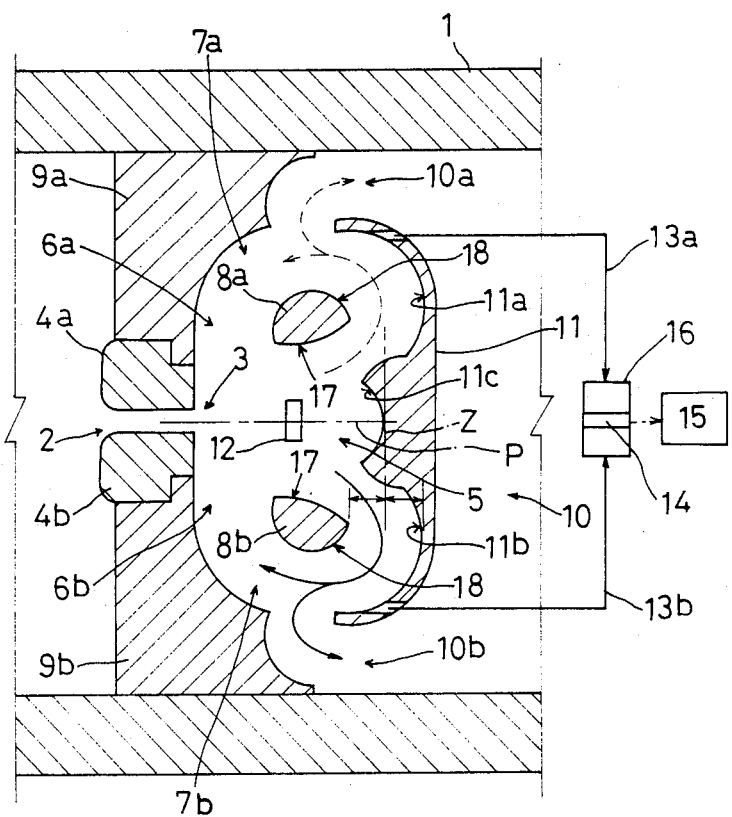
FIG. 16 is a section view showing a fluidic flowmeter according to still another embodiment of the present invention.
Figure 19:
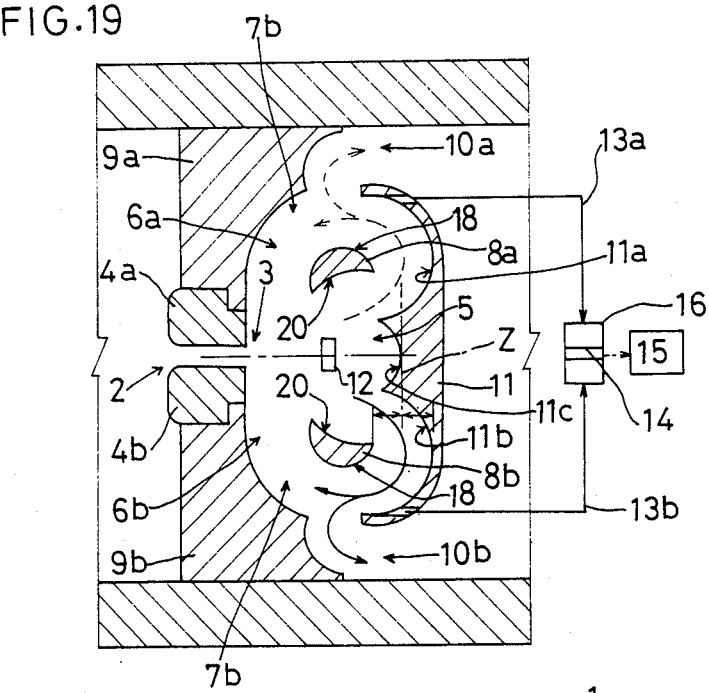
FIG. 19 is a section view showing a fluidic flowmeter according to still another embodiment of the present invention.

With the configuration of the second partition wall 11, as shown in FIGS. 16, 18 and 19, the second partition wall 11 achieves the best results if an innermost portion of a second curved face 11c is disposed at a position Z between first curved faces 11a and 11b of the second partition wall 11, as more fully described below.

That is to say, with this positional arrangement, as shown in FIG. 17, it becomes possible to restrict the measurement error to substantially zero in the large flow amount range exceeding 1,500 l/h. As being apparent from comparison between FIG. 17 and FIG. 13, the flow amount measurement may be carried out further accurately for an even wider flow amount range with the improvement on the configuration of the second partition wall 11 combined with the improvement on the configuration of the first partition walls 8a and 8b.

Next, a fluidic flowmeter shown in FIG. 16 has a second partition wall 11 which construction will be particularly described hereinafter. This second partition wall 11 includes a pair of first curved faces 11a and 11b respectively facing leading ends of the return flow passages 7a and 7b and a second curved face 11c disposed between the pair of first curved faces 11a and 11b and facing the target 12, the first curved faces 11a and 11b and the second curved face 11c respectively having a partially cylindrical face configuration formed concave in the discharge direction of the discharge nozzle 3 and having central axes thereof substantially parallel with each other. The innermost portion or downstream portion of the second curved face 11c is disposed at the position Z corresponding to substantially the middle between the downstream ends of the first partition walls, 8a or 8b, and the innermost portions or downstream portions of the first curved faces, 11a and 11b, in the discharge direction of the discharge nozzle 3.

That is to say, through the improvements on the configurations of the first and second partition walls 8a, 8b and 11, as shown in FIG. 17, it becomes possible; for example, to restrict the error in a flow amount measurement within the Japanese Official Tolerance Standard of ±2.5% for a home-use city-gas meter even if the measurement flow amount range is extended to e.g. 120 to 3,000 l/h required of the gas meter of this type.

In combination with the above improvement on the first partition walls, the outer peripheral faces of the first partition walls 8a and 8b may be formed; as shown in FIG. 18 for example, by the flat face portion 19 facing the enlarged pipe portion 5 and the curved face portion 18 facing the return flow passages 7a and 7b and the control nozzles 6a and 6b. Or, as shown in FIG. 19, the outer peripheral faces may be formed by the concave large-curvature-radius curved face portion 20 facing the enlarged pipe portion 5 and the small-curvature-radius curved face portion 18 facing the return flow passages 7a and 7b and the control nozzles 6a and 6b. The flat face portion 19 may be formed with a slight curve; or may be formed differently depending on the convenience.

Also, the first partition walls 8a and 8b may have a hollow tubular construction.

The configurations of the first and second curved faces 11a, 11b and 11c of the second partition wall 11 may be conveniently varied as long as the same comprise the substantially partially cylindrical faces. Further, the position of the second curved face 11a may be slightly displaced in the forward and backward direction from the position Z corresponding to the middle of the first partition wall 8a or 8b and the innermost portion of the second curved face 11a or 11b.

Figure 20:
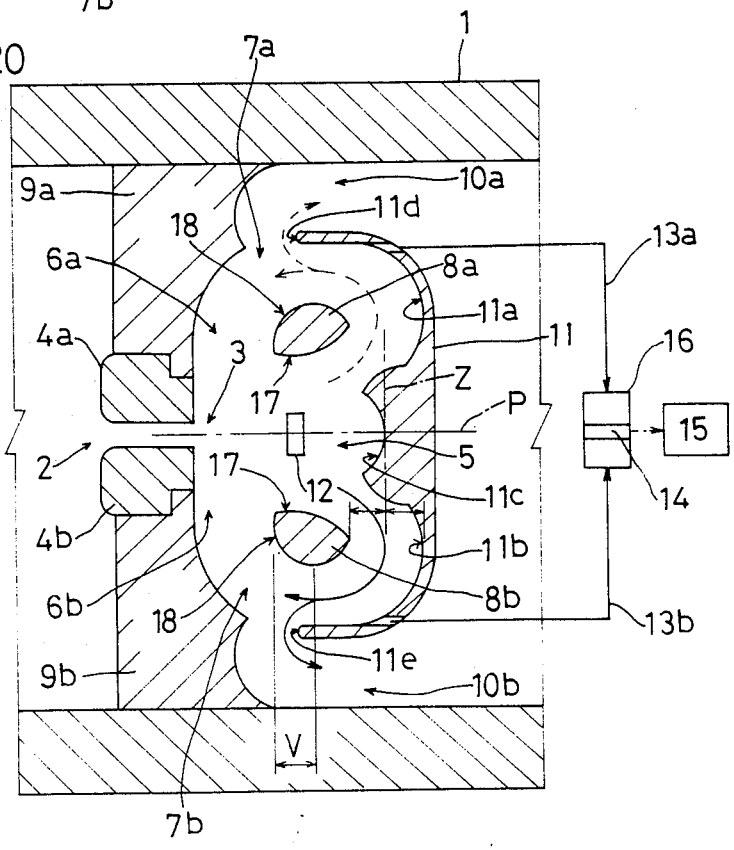
FIG. 20 is a section view showing a fluidic flowmeter according to still another embodiment of the present invention.

Moreover, the flow amount measurement error may be reduced also by adjusting the inlet openings of the discharge passages through a variation of the configuration of the second partition wall 11. For example, as shown in FIG. 20 and FIGS. 22 and 23, end portions 11d and 11e of the second partition wall 11 facing the inlet openings of the discharge passages 10a and 10b may be respectively disposed within an area V corresponding to a half of the first partition walls 8a and 8b towards the discharge nozzle 3 side in the discharge direction of the discharge nozzle 3, such that the inlet openings of the discharge passages 10a and 10b may be disposed closer to the control nozzles 6a and 6b.

Figure 21:
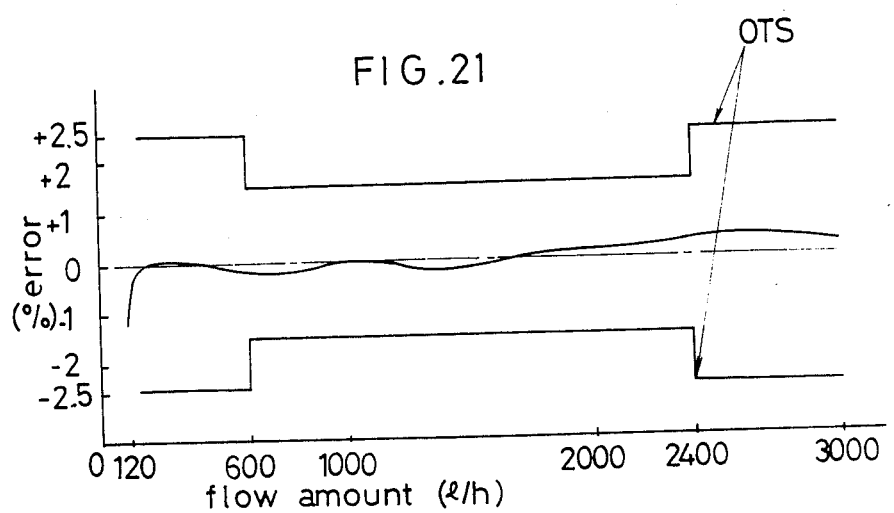
FIG. 21 is a graph illustrating results of experiments using the fludic flowmeter of FIG. 20.

With the above arrangement, as shown in FIG. 21, it is possible to effect a flow amount measurement with an error of less than ±1% over a wide measurement range of 120 to 3,000 l/h. As being apparent from comparison between FIG. 21 and FIG. 17, if the improvements are effected on the disposition of the inlet openings of the discharge openings 10a and 10b in addition to the improvements on the configurations of the first and second partition walls 8a, 8b and 11, the flow amount measurement may be carried out more accurately and effectively.

That is, through the improvements on the configurations of the first and second parition walls 8a, 8b and 11 and on the disposition of the inlet openings of the discharge passages 10a and 10b, as shown in FIG. 21, it becomes possible; for example, to restrict the error in a flow amount measurement within the Japanese Official Tolerance Standard of ±2.5% for a home-use city-gas meter even if the measurement flow amount range is extended to e.g. 120 to 3,000 l/h required of the gas meter of this type.

Figure 22:
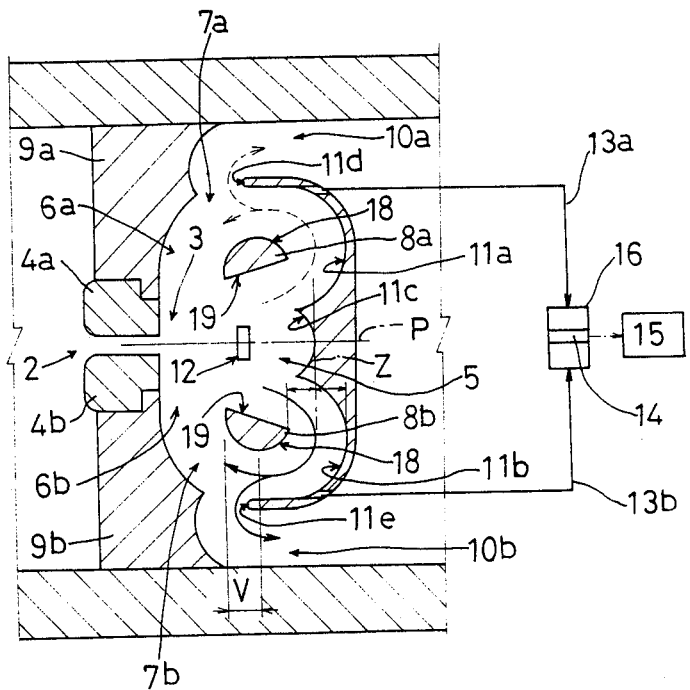
FIG. 22 is a section view showing a fluidic flowmeter according to still another embodiment of the present invention.
Figure 23:
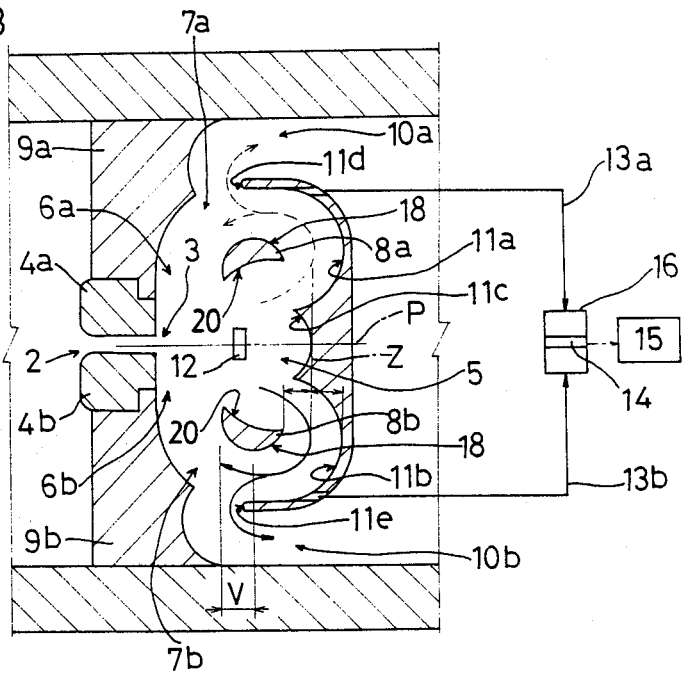
FIG. 23 is a section view showing a fluidic flowmeter according to still another embodiment of the present invention.

In combination with the above improvement on the configuration of the end portions of the second partition wall, the outer peripheral faces of the first partition walls 8a and 8b may be formed; as shown in FIG. 22 for example, by the flat face portion 19 facing the enlarged pipe portion 5 and the curved face portion 18 facing the return flow passages 7a and 7b and the control nozzles 6a and 6b. Or, as shown in FIG. 23, the outer peripheral faces may be formed by the concave large-curvature-radius curved face portion 20 facing the enlarged pipe portion 5 and the small-curvature-radius curved face portion 18 facing the return flow passages 7a and 7b and the control nozzles 6a and 6b. The flat face portion 19 may be formed with a slight curve; or may be formed differently depending on the convenience. Also, the first partition walls 8a and 8b may have a hollow tubular construction. Or, the first partition walls 8a and 8b may have the substantially semicylindrical outer peripheral faces.

The configurations of the first and second curved faces 11a, 11b and 11c of the second partition wall 11 may be conveniently varied as long as the same comprise the substantially partially cylindrical faces. Further, the position of the second curved face 11a may be slightly displaced in the forward and backward direction from the position Z corresponding to the middle of the first partition wall 8a or 8b and the innermost portion of the second partition wall 11a or 11b. Furthermore, the positions of the end portions 11d and 11e facing the inlet openings of the discharge passages 10a and 10b may be varied within the area V corresponding to the distance from the midpoints of the first partition walls 8a and 8b to their ends closest to the discharge nozzle 3, as shown in FIG. 23.

Figure 24:
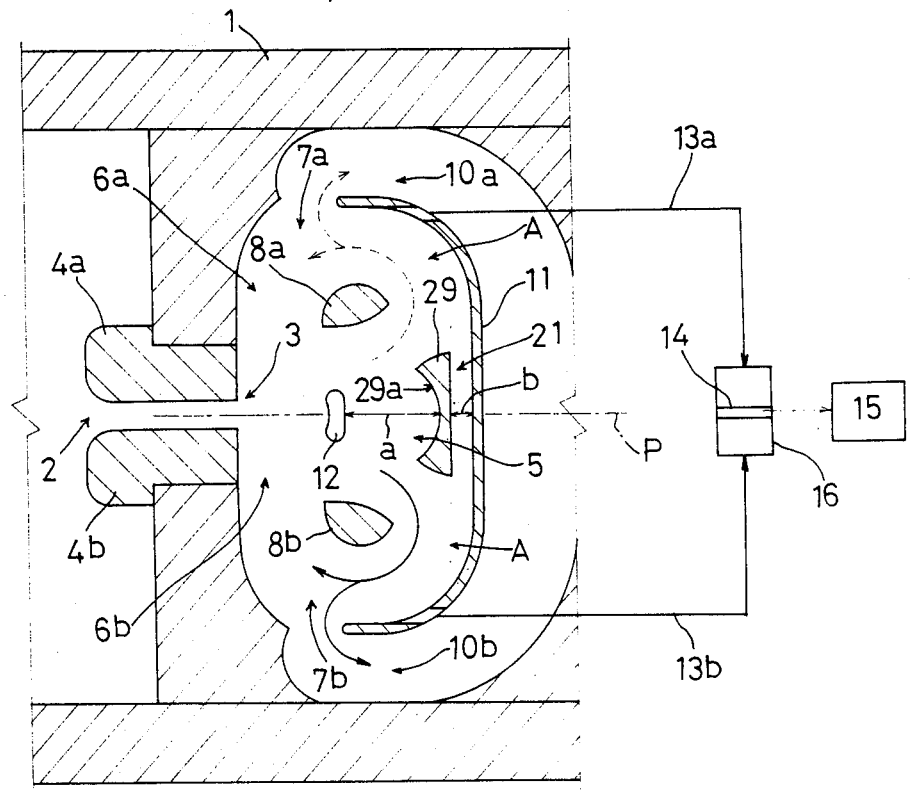
FIG. 24 is a section view showing a fluidic flowmeter according to still another embodiment of the present invention.

Also, various improvements are possible on the configuration of the target 12. For example, as shown in FIGS. 24 and 25, the target 12 may be formed such that its end faces 12b towards the first partition walls 8a and 8b have a semicylindrical or substantially semicylindrical configuration extending from a front face 12a to a back face 12c opposite to the front face 12a. This configuration is advantageous in that there will occur less disturbances in the flow at the downstream side of the target 12 and the linearity in the relationship between the discharged fluid amount and the flow direction thereof will improve and consequently the waveshape of the signals from the fluid measuring sensor will be less subjected to disturbances and the measurement error may be lessened.

Incidentally, the configuration of the target 12 may be varied in many ways in addition to the one shown in FIG. 25. For example, as shown in FIGS. 26(a) and 26(b), the concave portion of the front face 12a may have different shapes. Or, as shown in FIG. 26(c), the back face 12c may be formed as a concave face gradually receding towards the center thereof. Further, it is also possible to form the end faces 12b as flat faces. With these targets also, it is possible to achieve the similar effect to that described hereinbefore.

As shown in FIG. 24, between the second partition wall 11 and the target 12, there is provided a third partition wall 29 for forming inlet openings of the return flow passages 7a and 7b between the first partition walls 8a and 8b. Also, between the second partition wall 11 and the third partition wall 29, there is formed a communication passage 21 communicating between the return flow passages 7a and 7b. The front face 29a of the third partition wall 29 towards the target 12 is formed concave in the middle thereof facing the discharge direction of the discharge nozzle 3 relative to the ends thereof adjacent the first partition walls 8a and 8b. Preferrably, the distance, a, between the target 12 and the third partition wall 29 and the distance, b, between the second partition wall 11 and the third partition wall 29 should have a relationship of: a: b=2:1 to 5:1.

That is to say, when the fluid starts entering either of the return flow passages 7a, 7b with a change in the flow direction of the discharged flow from the discharge nozzle 3, the static fluid existing in the return flow passage 7a or 7b is smoothly forced by the incoming fluid into the communication passage 21 thereby not interferring with the incoming fluid. Accordingly, the incoming fluid may smoothly flow into the discharge passage 10a or 10b, whereby delay in the signal transmission from the flow amount measuring sensor may be restricted and the measurement error may be minimized especially in the minute or large flow amount range.

Next, experiments were conducted for looking into the effect of the communication passage 21.

In the first experiment, the relationship between the measurement flow amount and the measurement error was checked with a fluidic flowmeter having the same target 12 as employed in the previous embodiment and having the third partition wall 29 and the second partition wall 11 formed togetherwith as one unit thereby eliminating the communication passage 21. The results are shown in FIG. 27.

Figure 27:
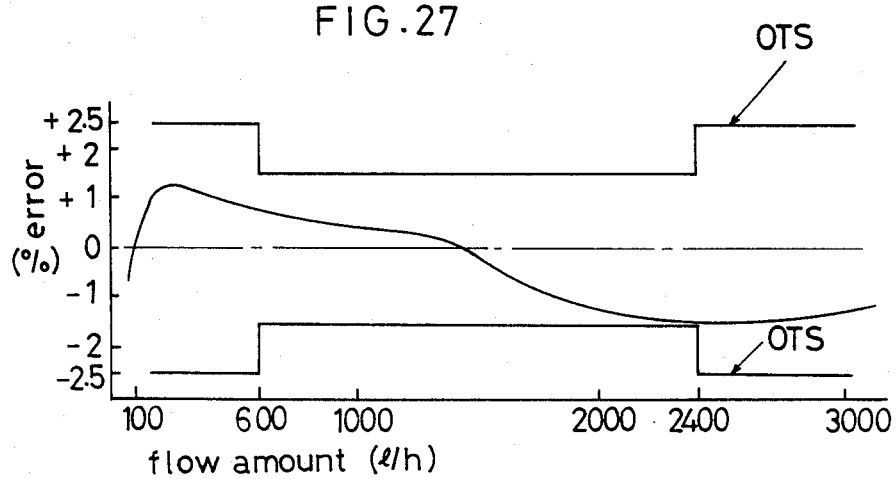
FIG. 27 is a graph illustrating results of experiments using a fludic flowmeter having no communication passage between its second and third partition walls.
Figure 28:
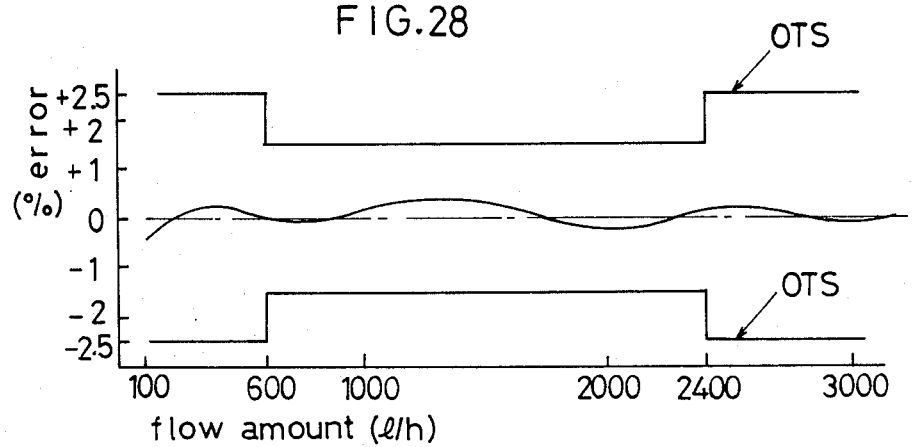
FIG. 28 is a graph showing results of experiments using the fluidic flowmeter of FIG. 24.

As being apparent from comparison between FIG. 27 and FIG. 28, with the construction having the communication passage 21 as shown in FIG. 24, it is possible to effect accurate flow amount measurement over a wide range extending between the maximum flow amount of 3,000 l/h to the minimum flow amount of 100 l/h with measurement error of less than ±0.5%, and it was proved that the communication passage 21 is extremly effective in restricting measurement error in measuring minute or large flow amount range.

Figure 29:
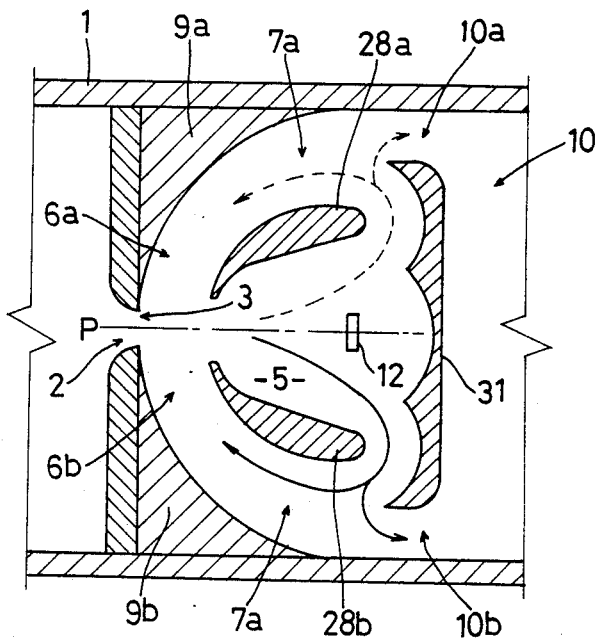
FIG. 29 is a section view showing a prior-art fluidic flowmeter.
Figure 30:
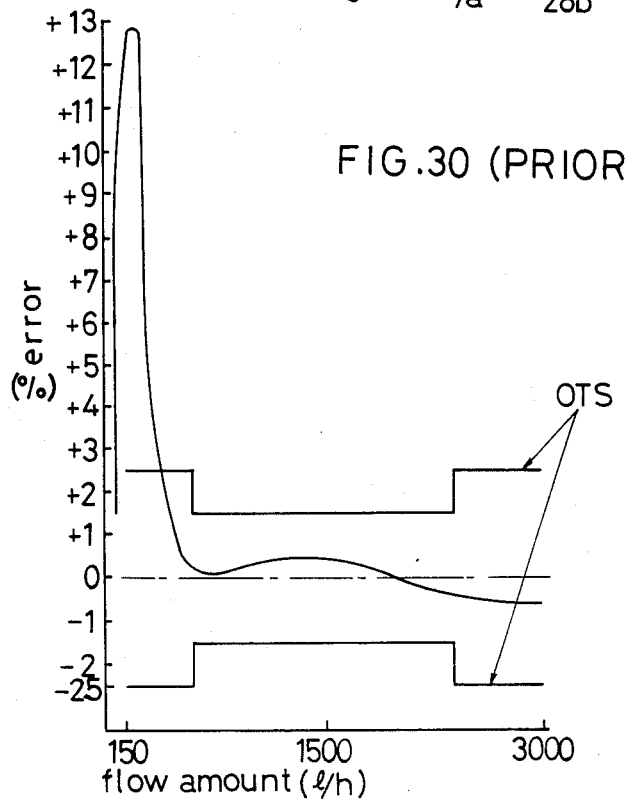
FIG. 30 is a graph showing results of experiments using the fluidic flowmeter of FIG. 29.

On the other hand, in the case of the prior art flowmeter shown in FIG. 29, the measurement error in the flow amount range of 150 to 3,000 l/h was more than 10% at its maximum in the minute flow amount range 150 to 300 l/h as shown in FIG. 30. Thus, as being apparent from comparison between FIG. 28 and FIG. 30, according to the present invention, it is possible to effect accurate flow amount measurement of such minute flow amount even if the measurement flow amount range is significantly extended.

Incidentally, this flowmeter is designed mainly for industrial or domestic use of fuel gas or water system; however, its use is not limited thereto.

What is claimed is:
1. A fluidic flowmeter comprising:
    a reduced diameter pipe portion, a discharge nozzle and an enlarged diameter pipe portion disposed in a series in said order in a fluid flow direction;
    a pair of control nozzles formed on a boundary between said discharge nozzle and said enlarged diameter pipe portion and oriented substantially normal to a discharge direction of said discharge nozzle, said control nozzles facing each other;
    a pair of return flow passages connecting between said respective control nozzles and a downstream side of said enlarged diameter pipe portion;
    a target for stabilizing of fluid flow direction at said enlarged pipe portion;
    a flow amount measuring sensor for detecting a variation in one of a pressure and a flow amount due to a variation in the flow direction of discharged fluid from said discharged nozzle;
    a pair of first partition walls for sectioning said enlarged diameter pipe portion, said control nozzles and said return flow passages;
    a second partition wall for forming discharge passages (togetherwith) together with said first partition walls;
    wherein a face of said target directed towards said discharge nozzle is positioned between a straight line interconnecting center portions of outer peripheral faces of said first partition walls and another straight line interconnecting upstream ends of said first partition walls at said control nozzle side.

2. A fluidic flowmeter as defined in claim 1, wherein said outer peripheral faces of said first partition walls are formed substantially cylindrical.

3. A fluidic flowmeter as defined as in claim 2 wherein said flow amount measuring sensor functions within an area surrounded by a straight line passing through the periphery of the opening of said discharge nozzle in parallel with a discharge center axis of said discharge nozzle as being viewed centrally of said first partition walls and a straight line parallel to the discharge center axis in contact with a point on said first partition walls closest to the side of said target and a straight line connected between the upstream ends of said first partition walls at the side of said control nozzles and by a wall face formed continuously with said discharge nozzle.

4. A fluidic flowmeter as defined in claim 1, wherein said second partition wall includes a pair of first curved faces facing said return flow passages and a second curved face facing said target between said first curved faces, said first and second curved faces being formed as substantially partially cylindrical faces concave in the discharge direction of said discharge nozzle and the axes of said curved faces being disposed substantially parallel with each other.

5. A fluidic flowmeter as defined in claim 4, wherein the downstream portion of said second curved face of said second partition wall is disposed substantially midway between the downstream ends of said first partition walls and the downstream portions of said first curved faces of said second partition wall.

6. A fluidic flowmeter as defined in claim 5, wherein respective ends of said second partition wall forming said discharge passages are disposed in an area between the midpoint and the upstream ends of the first partition walls in the discharge direction of said discharge nozzle.

7. A fluidic flowmeter as defined in claim 1, wherein a front face of said target is formed concave in the middle thereof facing the discharge direction of said discharge nozzle.

8. A fluidic flowmeter as defined in claim 7, wherein end faces of said target toward said first partition walls are formed as semicylindrical or substantially semicylindrical faces.

9. A fluidic flowmeter as defined in claim 8, wherein said second partition wall shuts off the downstream side of said enlarged diameter pipe portion and forms a pair of discharge passages respectively connected to said return flow passages and there is provided a third partition wall disposed between said second partition wall and said target and forming inlet openings of said return flow passages between said first partition walls, and a communication passage communicating between said return flow passages being provided between said second partition wall and said third partition wall, a front face of said third partition wall being formed concave in the middle thereof facing the discharge direction of said discharge nozzle.

10. A fluidic flowmeter as defined in claim 1, wherein said outer peripheral faces of the first partition walls include portions respectively opposed to said return flow passages and said control nozzles and formed as partially cylindrical portions with a small curvature radius and a further portion opposed to said target and formed as a partially cylindrical portion with a large curvature radius.

* * * * *